(12) United States Patent
Nagarkar et al.

(10) Patent No.: US 6,689,544 B2
(45) Date of Patent: Feb. 10, 2004

(54) ABLATION ENHANCEMENT LAYER

(75) Inventors: Pradnya V. Nagarkar, Newton, MA (US); James T. Richard, Upton, MA (US); Linda S. Heath, Acton, MA (US); Radha Sen, Foxboro, MA (US); Jyothsna Ram, Ormskirk (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/170,843

(22) Filed: Jun. 13, 2002

(65) Prior Publication Data

US 2002/0195435 A1 Dec. 26, 2002

Related U.S. Application Data

(62) Division of application No. 09/570,074, filed on May 12, 2000, now Pat. No. 6,485,839.
(60) Provisional application No. 60/134,318, filed on May 14, 1999.

(51) Int. Cl.[7] .............................................. C23C 14/34
(52) U.S. Cl. ..................... 430/321; 430/394; 430/200; 430/201; 219/121.69; 219/121.61; 219/121.8
(58) Field of Search ................................ 430/320, 321, 430/200, 201, 394; 219/121.68, 121.69, 121.8, 121.61

(56) References Cited

U.S. PATENT DOCUMENTS

| 4,234,654 A | 11/1980 | Yatabe et al. ................ 428/333 |
| 4,320,169 A | 3/1982 | Yatabe et al. ................ 428/333 |
| 4,386,130 A | 5/1983 | Hayashi et al. .............. 428/215 |

(List continued on next page.)

FOREIGN PATENT DOCUMENTS

| EP | 0733931 | | 9/1996 |
| GB | 2083726 | * | 3/1982 |
| JP | 61-142371 | * | 6/1987 |
| JP | 08-257770 | | 10/1996 |
| JP | 09-080221 | | 3/1997 |
| JP | 09-090327 | | 4/1997 |
| JP | 09-152567 | | 6/1997 |
| JP | 09-325365 | | 12/1997 |
| JP | 10-070151 | | 3/1998 |
| WO | WO 90/09730 | | 8/1990 |
| WO | WO 95/13566 | | 5/1995 |
| WO | WO 97/00777 | | 1/1997 |

OTHER PUBLICATIONS

H. Patel et al., Methods of Monitoring & Control of Reactive ITO Deposition Process on Flexible Substrates with DC Sputtering, Society of Vacuum Coaters, pp. 441–445 (1996).
K.P. Gibbons et al., ITO Coatings for Display Applications, Society of Vacuum Coaters, pp. 216–220 (1997).
Y. Hara et al., New Film Materials Made of ARTON® for LCD Application, Japan Synthetic Rubber Co., Ltd., IDW, pp. 399–402 (1997).

(List continued on next page.)

Primary Examiner—Martin Angebranndt
(74) Attorney, Agent, or Firm—Stephen W. Buckingham (57) ABSTRACT

An ablatable laminar imaging medium useful in the manufacture of a substantially transparent electrode assembly is disclosed. The laminar imaging medium comprises a substrate, a high-index metal oxide layer, an ablatable metallic conductive layer, a high-index conductive metal oxide layer, and an ablation enhancement layer. The ablation enhancement layer has an IR-absorption greater than the IR-absorption of said high-index conductive metal oxide layer and an IR-reflectivity less than the IR-reflectivity of said high-index conductive metal oxide layer. Presence in the laminar imaging medium of the ablation enhancement layer lowers the exposure threshold of the medium and improves ablation accuracy, both—when occasioned in the manufacture of LCD electrode patterns—resulting collectively and ultimately in a more reliably formed electrical architecture, less susceptible to unwanted "shorting".

3 Claims, 5 Drawing Sheets

U.S. PATENT DOCUMENTS

| | | | |
|---|---|---|---|
| 4,449,125 A | | 5/1984 | Clerc et al. .................. 340/752 |
| 4,465,736 A | | 8/1984 | Nishihara et al. ............ 428/332 |
| 4,740,782 A | | 4/1988 | Aoki et al. .................. 340/719 |
| 4,775,549 A | * | 10/1988 | Ota et al. ...................... 427/38 |
| 4,804,975 A | * | 2/1989 | Yip ........................... 346/76 L |
| 4,815,079 A | | 3/1989 | Snitzer et al. .................. 372/6 |
| 4,931,158 A | | 6/1990 | Bunshah et al. ........ 204/192.29 |
| 4,973,572 A | * | 11/1990 | DeBoer ....................... 430/201 |
| 5,118,538 A | | 6/1992 | Escher et al. ................... 428/1 |
| 5,164,565 A | | 11/1992 | Addiego et al. ........ 219/121.68 |
| 5,240,748 A | | 8/1993 | Van Esdonk et al. ........ 427/554 |
| 5,244,770 A | * | 9/1993 | deBoer et al. ............... 430/200 |
| 5,268,978 A | | 12/1993 | Po et al. ........................ 385/33 |
| 5,343,216 A | | 8/1994 | Katayama et al. ............. 345/92 |
| 5,373,576 A | | 12/1994 | Minns et al. ................. 385/125 |
| 5,418,880 A | | 5/1995 | Lewis et al. ................. 385/123 |
| 5,536,466 A | * | 7/1996 | Ogawa et al. ......... 219/121.67 |
| 5,561,440 A | | 10/1996 | Kitajima et al. ............... 345/87 |
| 5,597,626 A | | 1/1997 | Eguchi ........................... 428/1 |
| 5,652,158 A | | 7/1997 | Bae ...................... 437/40 TFT |
| 5,691,063 A | * | 11/1997 | Davis et al. .............. 430/270.1 |
| 5,879,861 A | | 3/1999 | Van Damme et al. ...... 430/302 |
| 6,004,723 A | | 12/1999 | Figov ...................... 430/272.1 |
| 6,379,509 B2 | | 4/2002 | Choi et al. ............. 204/192.29 |
| 6,485,839 B1 | * | 11/2002 | Nagarkar et al. ........... 428/461 |

OTHER PUBLICATIONS

M. Rottmann et al., Abstract, Change of Optical, Electrical and Structural Properties of Sputtered Indium Tin Oxide Films by Application of a New Reactive Sputter Atmosphere, Proc. SPIE vol. 2255 (Sep. 1994).

Abstract, Japanese Pub. No. 09171188, Hori Takahide, Lamination Type Transparent Conductive Film (Jun. 30, 1997).

P.Y.Z. Chu et al., 42.2: A New Conductor Structure for Plastic LCD Applications Utilizing "All Dry" Digital Laser Patterning, SID International Symposium Digest of Technical Papers, vol. 29, pp. 1099–1101 (May 17, 1998).

G. Cochrane et al., Abstract, Optimization of the Electrical and Optical Properties of ITO Layers Deposited by Magnetron Sputtering, Proc. SPIE vol. 2017 (Oct. 1993).

Search Report for PCT/US00/13031 dated Oct. 6, 2000.

Research Disclosure, LCD with Structured Conducting Orientation Layer; Nov. 1998, pp. 1473; 41548.

* cited by examiner

ABLATION ENHANCEMENT LAYER

CROSS REFERENCE TO RELATED APPLICATIONS

This application is a divisional of application Ser. No. 09/570,074, filed May 12, 2000 now U.S. Pat. No. 6,485,839, which claims priority under 35 U.S.C. §119(e) to U.S. Provisional Application Serial No. 60/134,318, filed May 14, 1999, the disclosures of which are incorporated by reference herein.

FIELD

In general, this invention relates to an ablatable laminar imaging medium having an optimized exposure threshold, and in particular, one wherein said optimized threshold is resultant of the employment therein of an ablation enhancement layer with predefined absorption and reflection values.

BACKGROUND

Liquid crystal displays comprise a liquid crystal material sandwiched between two substantially transparent electrode assemblies. Touch screen displays of either the resistive or capacitive types comprise a display screen (for example, a cathode ray tube) having superposed thereover two substantially transparent electrode assemblies. In both types of displays, each of these electrode assemblies typically comprises a substrate on which is deposited a conductive layer thin enough to be substantially transparent.

The term "substantially transparent" is used herein to mean that the electrodes transmit sufficient visible light so that the two superposed electrodes will not substantially obscure, nor substantially distort the color of, a liquid crystal display or touch screen display incorporating the two electrodes. Typically, commercial specifications require that the two superposed electrodes have a transmittance of at least 80% at 550 nm.

In liquid crystal displays the substrate is usually glass, whereas touch screen displays usually employ a synthetic resin (plastic) substrate for at least one electrode. The conductor is often formed from indium tin oxide or a similar metal oxide. The conductor is typically formed by depositing the oxide by sputtering or chemical vapor deposition at a high temperature, and then annealing, also at a high temperature. On glass substrates temperatures in excess of 300° C. may be used to deposit and anneal the conductor; on plastic substrates, lower temperatures must be used, with resultant higher electrical resistance in the conductor.

Alternatively, both liquid crystal displays and touch screen displays may make use of thin film electrodes comprising a metallic conductive layer sandwiched between two layers having high refractive indices; these two layers usually being formed from metal oxides. The metallic conductive layer is patterned so as to divide it into a plurality of electrodes, and conductors are attached to each of these electrodes to enable formation of the desired patterns in the liquid crystal material.

Conventional prior art (i.e., photolithographic) processes for forming electrodes generally involve the deposition of layers of photoreactive and non-photoreactive thin films (typically, metal oxides) onto a substrate, the selective exposure of said layers through a mask (or like phototool) corresponding to the desired electrode pattern, and removal of either the exposed or unexposed portions—depending on the nature of the photoreaction involved—of the thin film layers.

Prior art processes for forming electrodes also often require the use of elevated temperatures of 200° C. or more, which in practice requires the use of glass substrates or expensive high temperature plastics (polymers are known which have glass transition temperatures above 225° C. and can thus withstand processing at such temperatures). There are many applications for liquid crystal displays (for example, in cellular telephones and other mobile electronic devices) where it would be advantageous to use less expensive plastic substrates having lower glass transition temperatures if thin film electrodes could be formed on such substrates.

While applicability of the above processes still remain practical and commercially viable, interest in the formation of electrode patterns by direct laser imaging (particularly, laser ablation processes) continues to develop at a relatively high rate—in part, because of laser imaging's potentially higher accuracy, its faster production, and its independence from certain costly pre-imaging processes (e.g., mask preparation). Potential also exists in the use of lighter and cheaper plastic substrates.

The formation of LCD electrode patterns by laser ablation essentially involved the direct pattern-wise removal of portions layers of electrically conductive and insulating materials by exposing said portions to laser light of an intensity and quality (e.g., wavelength) sufficient to completely or partly decompose said material. The reaction can be fairly characterized as "explosive" (i.e., on a microscopic level), producing vapor-like or gas-like streams consisting of fragments of the removed material. An example of such process is disclosed in U.S. patent application Ser. No. 09/009,391, now U.S. Pat. No. 6,379,509, filed by Hyung-Chul Choi, Yi-Zhi Chu, Linda S. Heath, and William K. Smyth on Jan. 20, 1998.

Overall, most laser ablation electrode-forming processes produce good results. Regardless, areas for further improvement exist.

For example, it has been observed that the process of ablating a metal and partial conductor sometimes results in the formation of ridges (like undesirable physical anomalies) as a result of the volcanic action of ablated metal from beneath the partial conductor. These ridges reduce boundary definition of ablated areas, and as such, can potentially compromise the pixel resolution in a finished flat panel display. While conventional post-patterning cleaning processes can be employed to address this problem, the debris on etched edges is difficult to remove, and requires vigorous steps that can damage the thin film structure.

Also, in the conduct of conventional laser ablation processes, high threshold exposure energies are typically involved. Aside from the apparently high energy costs, use of intense ablation exposure produces correspondingly intense temperature elevations in and around the area of ablation. This limits selection of material used for the ablation medium to those having high thermal resistance. And, in the selection of substrates, this greatly constrains the use of plastic materials, which is often preferred over the more common glass substrates when lower costs, greater flexibility, and lighter weight are desired.

Finally, laser ablation produces residue, which needs to be washed off. Being essentially composed of the same material that ultimately becomes the finished electrode, such residue, if left in the valleys between electrodes, can cause an electrical short. The presence of such a short is of course undesirable, since it in effect turns the two adjacent electrodes into a single electrode and thereby adversely affects the quality of a liquid crystal or touch screen in which the electrode assembly is used.

SUMMARY

In response to the above-identified issues, an ablatable laminar imaging medium is described herein, characterized by its incorporation of an ablation enhancement layer, the ablation enhancement layer being composed, configured, and located to effectively reduce the threshold energy requirement for effecting laser ablation. The use of the ablation enhancement layer dramatically improves laser ablation efficiency (i.e., faster scan speed, lower exposure energy threshold, and quality), and promotes "cleaner" ablation of the metallic layer(s) in the area of exposure (e.g., well ablated areas with few "ridges", unablated residue, and/or other like ill-defined edges, surfaces, and boundaries).

In particular, the ablatable laminar imaging medium—which is particularly useful in the manufacture of a substantially transparent electrode assembly—can be defined as comprising: (a) a substrate; (b) a high-index metal oxide layer; (c) an ablatable metallic conductive layer; (d) a high-index conductive metal oxide layer; and (e) an ablation enhancement layer having an IR-absorption greater than the IR-absorption of said high-index conductive metal oxide layer and an IR-reflectivity less than the IR-reflectivity of said high-index conductive metal oxide layer.

The present invention also provides a new process for dealing with (cf., "cleaning") remnant and/or residual ablation enhancement material left in the course of ablation, which for many applications and products is unwanted. The characterizing steps of the inventive method involve the execution of a "cleaning" operation in close connection with a "patterning" operation, preferably using the same apparatus (e.g., the same laser) for both. The new process can be accomplished by either a sequential methodology (i.e., ablation patterning, followed by ablation cleaning) or a continuous methodology (i.e., ablation patterning conducted contemporaneously with ablation cleaning).

In light of the above, it is a principal object of the present invention to provide an ablatable laminar imaging, useful in the manufacture of an electrode assembly for a flat panel display, having a low exposure threshold requirement.

It is another object of the present invention to provide an ablatable laminar imaging medium having incorporated therein an ablation enhancement layer, the IR-reflectivity and IR-absorptivity of the ablation enhancement layer specifically designed for favorable effect on the medium's exposure threshold.

It is another object of the present invention to provide photo-ablation means for making an electrode assembly that requires less exposure energy, thus generating less heat, and thus allowing for use in manufacture of relatively inexpensive, heat-sensitive stacks and light-weight substrates (such as plastic substrates) that typically have less thermal resistance than glass.

It is another object of the present invention to provide a method for patterning an ablatable laminar imaging medium, wherein the patterning operation is executed in close association with a cleaning operation, i.e., the cleaning operation being accomplished by laser ablation after the patterning operation, preferably by the same apparatus used therefor.

It is another object of the present invention to provide a method for patterning an ablatable laminar imaging medium, wherein the patterning operation is executed in close association with a cleaning operation, i.e., the cleaning operation being accomplished by laser ablation contemporaneously with the patterning operation, preferably by the same apparatus used therefor.

Other objects of the present invention will become apparent from the detailed description below taken in conjunction with the accompanying drawings.

BRIEF DESCRIPTION OF THE DRAWINGS

Each of FIGS. 1 to 5 provide schematic representational illustrations of embodiments of the present invention, wherein.

The relative locations, shapes, and sizes of objects in the Figures are exaggerated to facilitate the discussion and presentation herein.

DETAILED DESCRIPTION

The present invention provides means for preventing, reducing, and/or otherwise alleviating the incidence of certain undesirable structural defects in electrode assemblies manufactured according to conventional laser ablation processes. These defects are essentially trace or residual metals or metal oxides left on the electrode assembly by incomplete, inefficient, and/or unfocused ablation patterning, and/or inadequate post-patterning cleaning. Such residue will—if the incidence is high—produce an unacceptable level of electrical shorts (cf., dark pixels) in a fully assembled flat panel display product.

The means disclosed herein target inefficiencies occurring at both the ablation patterning stage and the subsequent cleaning stage.

Focussing first on the ablation patterning stage, it has been found that ablation can be performed more efficiently, at a lower energy threshold, and with greater control, when using an ablatable laminar imaging medium 10 that incorporates therein an ablation enhancement layer 100. The primary function of the ablation enhancement layer 100—typically the top layer of said medium 10—is to provide optical properties at the surface of medium 10 more conducive to efficient ablation than would otherwise be the case in its absence.

While the inventors do not wish to be limited to any theory in explanation of the their invention, it was recognized that those components most preferred for use as electrodes in respect of their electrical functionality were not necessarily the best materials for use in respect of laser ablation. Use of a separate ablation enhancement layer 100 resolves this issue without compromising electrical functionality. When an ablation enhancement layer 100 is coated in the top surface of ablatable laminar imaging medium 10, the underlying electrode-forming layers 213 ablate much "cleaner", without "ridges", and with dramatically-improved laser ablation efficiency (e.g., at a lower exposure energy threshold, at a faster scan speed, etc.).

Figure 1:
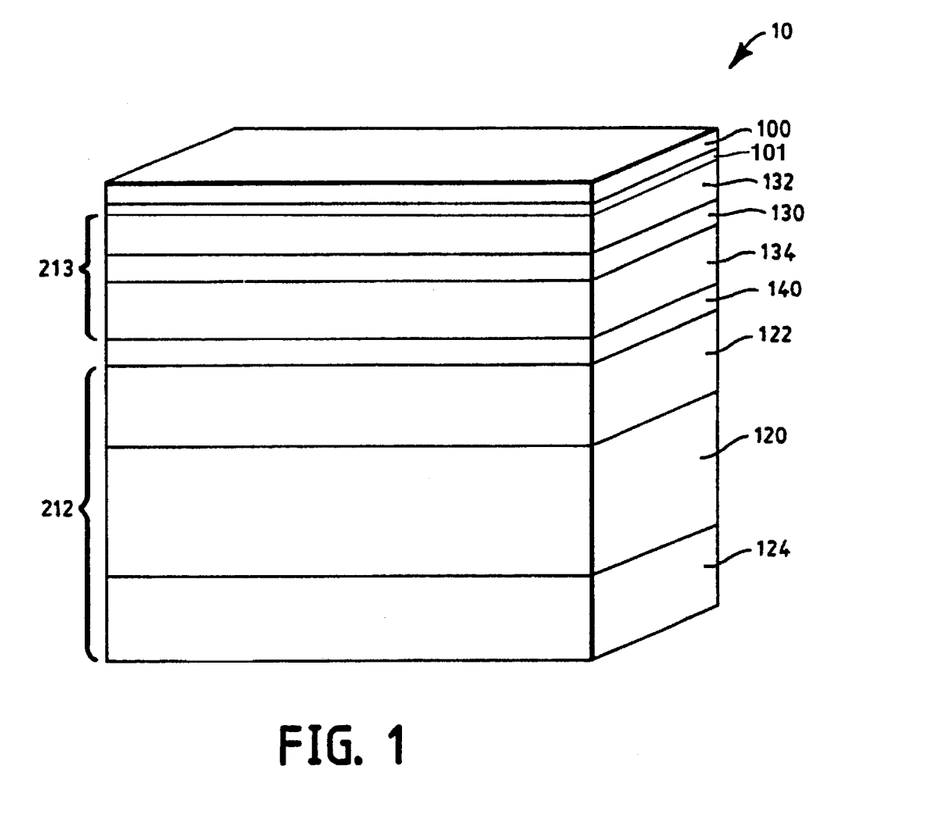
FIG. 1 illustrates in cross-section an ablatable laminar imaging medium 10 according to the present invention.

In the embodiment illustrated in FIG. 1, the ablatable laminar imaging medium 10 comprises a base 212 (i.e., a substrate 120, coated or otherwise) a high-index metal oxide layer 134, an ablatable metallic conductive layer 130, a high index conductive metal oxide layer 132, and an ablation enhancement layer 100 configured to have an IR-absorption (i.e., the absorption of infrared irradiation) greater than the IR-absorption of the high-index conductive metal oxide layer 132 and an IR-reflectivity (i.e., reflection of infrared irradiation) less than the IR-reflectivity of said high-index conductive metal oxide layer 132.

The ablation enhancement layer 100 should generally be located in close proximity to the electrode-forming layers 213, though there is no absolute requirement that the structures be physically adjacent. In other words, they should be in sufficiently close proximity in the sense that the transfer of energy from one to the other is assured, a condition that will not necessarily be defeated if intermediate functional layers or coatings are present.

As to the specific composition of the ablation enhancement layer 100, those skilled in the art will appreciate that several materials and compositional configurations can be used to effect the aforementioned optical properties. Regardless, the presently contemplated materials for the ablation enhancement layer 100 include carbon black, IR dyes, Al, Au, Pt, or Cu. Carbon black dispersed in a water-soluble polymeric matrix is generally preferred.

The substrate 120 used in the present process may be formed of any material having sufficient mechanical integrity and a surface smooth enough to permit the formation of electrodes thereon. The substrate must, like the other layers of the electrode assembly be sufficiently transparent to allow its use in a liquid crystal display. Glass substrates may be used, but it is generally preferred that the substrate be formed from a synthetic resin. Preferred resins for this purpose include polycarbonate and poly(bis(cyclopentadiene) condensate)s, such as the material sold by Lonza AG, Münchensteinerstrasse 38, CH-4002 Basel, Switzerland under the trademark "TRANSPHAN". This material is a film of a polymer sold by Japan Synthetic Rubber Co. Ltd., 2-11-24 Tsukiji, Tokyo 104, Japan under the trademark "ARTON"; this polymer is stated by the manufacturer to be of the formula:

(in which X is a polar group). Other substrates, which may be useful in the present invention, include polyether sulfones and poly(alkyl)acrylates.

The substrate 120 may be provided with coatings on one or both surfaces to act as gas and moisture barriers, and/or to improve the hardness and scratch resistance of the substrate and/or to improve the adhesion of the high index layer to the substrate. For example, as shown in FIG. 1, it has been useful to provide on both surfaces of the substrate a coating of a hard polymer, i.e., coatings 122 and 124. Such hard coatings 122 and 124 will typically have a thickness of from about 1 to about 15 $\mu$m, preferably from about 2 to about 4 $\mu$m and may be provided by free radical polymerization (initiated either thermally or by ultra-violet radiation) of an appropriate polymerization material. An especially preferred hard coating is the acrylic coating sold under the trademark "TERRAPIN" by Tekra Corporation, 6700 West Lincoln Avenue, New Berlin, Wis. 53151.

It is also useful to provide on one surface of the substrate—generally, that surface onto which the metallic layers 213 are to be subsequently deposited—a thin (typically 10–30 nm) layer of silica ($SiO_x$) to act as a gas and moisture barrier for the eventual liquid crystal display assembly, and to act as an adhesion promoter to improve the adhesion of the high index layer. See, barrier layer 140 in FIG. 1.

When both a hard coating and a silica layer are provided on the substrate, they may be provided in either order. (The term "silica" is used herein in accordance with its normal meaning in the art to mean a material of the formula $SiO_x$ where x is an integer not necessarily equal to two. As those skilled in the art are aware, such silica layers are often deposited by chemical vapor deposition or sputtering of silicon in an oxygen atmosphere, so that the material deposited does not precisely conform to the stoichiometric formula $SiO_2$ of pure silica.)

According to the present manufacturing process, there are deposited on the substrate, in order, the high-index metal oxide layer 134, the ablatable metallic conductive layer 130, the high-index conductive metal oxide layer 132, and the ablation enhancement layer 100. Although other techniques, for example e-beam and thermal evaporation may be employed to deposit these layers, the layers are preferably deposited by sputtering or by chemical vapor deposition, with dc sputtering being especially preferred, although RF, magnetron and reactive sputtering and low-pressure, plasma-enhanced and laser-enhanced chemical vapor deposition may also be used.

When the preferred plastic substrates are used, the deposition of each of the three layers should be effected at a temperature not greater than about 170° C. in order to prevent damage to the plastic substrate; the temperature limit of course varies with the exact substrate employed and in the case of the aforementioned TRANSPHAN substrate, this temperature should not be greater than 160–165° C.

The high-index metal oxide layer 134 adjacent the substrate 120 may be electrically insulating or conductive, though the latter—despite the use of ablation enhancement layer 100—is still generally preferred as a matter of caution, since the use of an insulating high index layer can only further ensure that, should any portion of this high index layer 134 remain between adjacent electrodes after the patterning step, this remaining portion will not cause an electrical short between the electrodes. However, a conductive high index layer 134 may be used for applications where the demand for such safeguards are more relaxed.

Whether insulating or conductive, the high-index layer 134 is typically formed from a metal oxide, preferred oxides for this purpose being indium oxide ($In_2O_3$), titanium dioxide ($TiO_2$), cadmium oxide (CdO), gallium indium oxide, niobium pentoxide ($Nb_2O_5$), indium tin oxide and tin dioxide ($SnO_2$). As is well known to those skilled in the art of forming electrodes for liquid crystal display assemblies (see, for example, Patel et al., "Methods of Monitoring and Control of Reactive ITO Deposition Process on Flexible Substrates with DC Sputtering," Society of Vacuum Coaters 39th Annual Technical Conference Proceedings, 441–45 (1996), and Gibbons et al., "ITO Coatings for Display Applications," Society of Vacuum Coaters 40th Annual Technical Conference Proceedings, 216–220 (1997)), the conductivity of such metal oxide layers can be controlled over several orders of magnitude by varying the conditions under which the oxide layer is deposited. For the preferred dc sputtering deposition process, the relevant conditions include temperature, reactor pressure, partial pressure of oxygen, dc bias and deposition rate. Doping may also be used to control the conductivity of the insulating layer. Typically, the thickness of the insulating layer will be in the range of from about 20 to about 80 nm.

The refractive index needed in the high-index metal oxide layer 134 adjacent the substrate 120 (and in the high index conductive metal oxide layer 132) will vary somewhat depending upon the other layers present in the final flat panel display product in which the electrode assembly of the present invention is to be incorporated. In general, the refractive index of the high index layers 134 and 132, measured at 550 nm, will exceed 1.6, and the refractive indices of the preferred metal oxide high index layers can readily be made to exceed 1.9, as described in the papers mentioned above.

The ablatable metallic conductive layer 130 may be formed from any metal or metal alloy capable of being deposited by the deposition process employed and having sufficient conductivity to provide the required low resistance in the final electrode assembly. The composition and configuration of layer 130 must also provide absorptivity to the irradiation used for patterning at a level sufficient to allow the explosive reactions involved in ablation to occur at the designated and desired threshold energies. Preferably, the conductive layer comprises at least one of gold, silver and a gold/silver alloy (for example, the alloy described in U.S. Pat. No. 4,234,654). Since gold improves the corrosion resistance of the conductive layer, it is in general desirable that this layer 130 comprise a layer of silver coated on one or both sides with a thinner layer of gold, e.g., less than one monolayer. For example, a 10 nm layer of silver sandwiched between two 1 nm layers of gold has been found to give good results. The overall thickness of the ablatable metallic conductive layer 130 will typically be in the range of about 5 to about 20 nm.

The preferred materials and processes for forming the high-index conductive metal oxide layer 132 are the same as those for forming high-index metal oxide layer 134, except of course that the conditions used to deposit the layer 132 should be varied, if need be, so as to give the layer 132 at least partial conductivity. As is well known to those skilled in the art, the resistance of layers used in electrode assemblies is normally measured over the whole surface of the assembly, and in the present case it has been found that using a high-index conductive metal oxide layer with a conductivity of at least about 400 ohms/square, and desirably from about 100 to about 200 ohms per square, gives satisfactory results. The thickness of the layer 132 is desirably in the range of about 20 to about 100 nm.

Examples of combinations of ablatable electrode-forming layers 213 which have been found to give good results in the present process are given in Table 1 below (in which "ITO" stands for indium tin oxide).

TABLE 1

| Layer 134 (Insulating) | Ablatable Metallic Conductive Layer 130 | Metal Oxide Conductive Layer 132 |
| --- | --- | --- |
| ITO, 40 nm | Ag, 10 nm | ITO, 47 nm |
| ITO, 40–42 nm | Ag, 9–10 nm/Au, 1–1.5 nm | ITO, 47 nm |
| ITO, 40–42 nm | Au, 1 nm/Ag, 10 nm/ Au 1 nm | ITO, 47 nm |
| $SnO_2$, 42 nm | Ag, 10–12 nm | ITO, 47 nm |
| $SnO_2$, 42 nm | Ag, 9–10 nm/Au, 1–1.5 nm | ITO, 47 nm |
| $SnO_2$, 42 nm | Au, 1 nm/Ag, 10 nm/ Au 1 nm | ITO, 47 nm |

In accord with the present invention, following the deposition of above-mentioned layers 213, ablation enhancement layer 100 is deposited over the top high-index conductive layer 132.

It is reemphasized that there is no absolute requirement that ablation enhancement layer 100 be adjacent to electrode-forming layers 213. With the ablation enhancement layer 100, it is possible to ablate non-conducting layers such as an intermediate metal-oxide layer 101 having poor absorption in IR, e.g., 2–4 m layers of ITO only type strictures. This does not require a metallic layer underneath the non-conducting layer, since energy absorption in the ablation enhancement layer 100 is adequate to remove several microns of lower conductivity or non-conducting metal oxide. However, inasmuch as it is the goal of the ablation enhancement layer 100 to reduce the reflection of light from the sample surface and increase absorption within the sample, if the number and thickness of intermediate layers between ablation enhancement layer 100 and electrode-forming layers 213 are too large, then concerns arise as to the diminishing effect of the energy concentration by the ablation enhancement layer 100. As energy passes through said intermediate layers, it may disperse and dissipate in its transit, and thereby effect poor resolution. Regardless, as will be appreciated by those skilled in the art, the likely thicknesses of any intermediate layers would make such concerns negligible.

Also relevant is the location of the ablation enhancement layer 100 on the top surface of the ablatable laminar imaging medium 10. While there is no absolute requirement that this layer be the exposed, uppermost surface of medium 10, in view of its functionality, the layer should, if this is not to be the case, nevertheless be positioned such that during the expected imagewise exposure of medium 10, exposure irradiation will be incident upon the layer 100, before incidence upon the ablatable electrode-forming layers 213.

In respect of its composition, the aforementioned ingredients of ablation enhancement layer 100 should be formulated to still allow passage of exposure irradiation therethrough. Thus, while carbon black is a preferred ingredient, it should not be formulated to create a layer with an optical density so high that all exposure energy is absorbed in the ablation enhancement layer 100. In general, only trace amounts of carbon black will be necessary to produce absorptivity and reflectivity parameters better than otherwise available, for example, with the use of expected configurations of high index conductive metal oxide layer 132.

Examples of ablatable laminar imaging media incorporating an ablation enhancement layer 100, and the performance thereof, are summarized in Table 2, supra. (The constituency of the electrode-forming layers 213 are essentially of the same type disclosed in Table 1, infra.)

TABLE 2

| Sample | Ablation Enhancement Layer 100 | Thickness Range | Preferred Thickness | Etching Results (Exposure Threshold)* |
|---|---|---|---|---|
| Prior Art | None | n/a | n/a | ~10 W |
| Ex. 1 | Carbon Black (Aqueous) | 150 nm–1 µm | 400–500 nm | ~7 W |
| Ex. 2 | Carbon Black (Solvent) | 1.5 µm–6 µm | 2.5 µm | ~7 W |
| Ex. 3 | Aluminum** | 25 Å–300 nm | 100–250 Å | ~4.5 W |

Notes:
*Laser Specification: 15 W Thermal Laser, 110 nm wavelength;
**Coated by vapor phase deposition.

As can be observed from the Table, the exposure thresholds for Examples 1 to 3 represent a significant improvement over the prior art example.

Inasmuch as the utility of the ablation enhancement layer 100 is material only during the imagewise patterning of ablatable laminar imaging medium 10, i.e., providing no critical functionality in a finished electrode assembly, another of the considerations in its configuration is the selection of materials best suited to facilitate its removal (cf., "cleaning") after ablation patterning.

The formulation of "easily removable" compositions is within the ability of those skilled in the art. For example, carbon black formulations can be either solvent-based or water-based, in which case, post-patterning cleaning can be occasioned by an alcohol rinse (for the former) or a simple water rinse (for the latter). For more resilient ablation enhancement layers,—for example, those utilizing aluminum—it may be desirable to employ a release layer 101, which when treated to an appropriate rinse, disperses, dissolves, or otherwise degrades, thereby "undercutting" said ablation enhancement layer 100.

In patterning a desired electrode structure into ablatable laminar imaging medium 10, it is important that the patterning extend completely through both the high-index conductive metal oxide layer 132 and the ablatable metallic conductive layer 130 to ensure that there are no short circuits between adjacent electrodes, a result facilitated by the use of the ablation enhancement layer 100. In practice, the patterning will usually extend completely through the high index layer 134 adjacent the substrate; however, as already indicated, it is still desirably essential that the high index layer have sufficient resistance to prevent unwanted current leakage between adjacent electrodes should any portion of the high index layer remain after patterning.

The preferred technique for patterning is to use an infrared laser emitting in the range of about 700 to about 1200 nm. The infrared radiation is, after passing through the ablation enhancement layer 100, absorbed primarily within the ablatable metallic conductive layer 130, leading to rapid and reliable patterning of this layer 130. Desirably, the laser used for the laser ablation is a fiber laser employing a double-clad optic fiber, as described for example in U.S. Pat. Nos. 4,815,079; 5,268,978; 5,373,576 and 5,418,880. Typically, the energy required for patterning the electrode assembly is about 800 mJ cm$^{-2}$, so that using a fiber laser with a 6 W output and an 8.5 µm spot radius (measured on a 1/e$^2$ basis) permits scanning the spot over the substrate at about 70 m sec$^{-1}$, and patterns approximately 400 cm$^2$ per minute of the substrate.

Typically the laser beam is scanned in a raster pattern over the substrate while being modulated under the control of digital signals from a raster image processor. This technique has the advantage that it requires only the preparation of a digital image of the proposed electrode pattern, so that the apparatus can change patterns with essentially no down time.

Following the patterning operation, unablated excess remnants of the ablation enhancement layer 100 must be removed, otherwise it may effect the electrical integrity of an assembled flat panel display product. Typically, as mentioned earlier, this removal step, will be dependent on the chemical resistance of the component materials, as well as the physical durability of the electrode-forming layers 213.

Another, perhaps more preferable, innovative alternative would be to conduct the patterning operation in such a manner as to contemporaneously remove the unwanted areas of the ablation enhancement layer 100, leaving only the blasted residue to contend with. Two processes by which this can be accomplished—constituting the earlier-mentioned means for improving ablation efficiencies at the "cleaning" stage—are illustrated schematically in FIGS. 2A–2C and FIGS. 3A–3B.

Figure 2A:
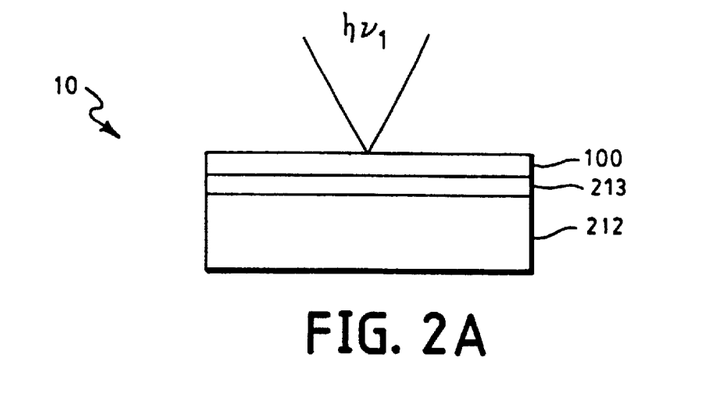
FIGS. 2A to 2C illustrate a method of processing the ablatable laminar imaging medium 10 of FIG. 1, the method involving sequential (i.e., "step-wise") laser imaging and laser cleaning operations.
Figure 2B:
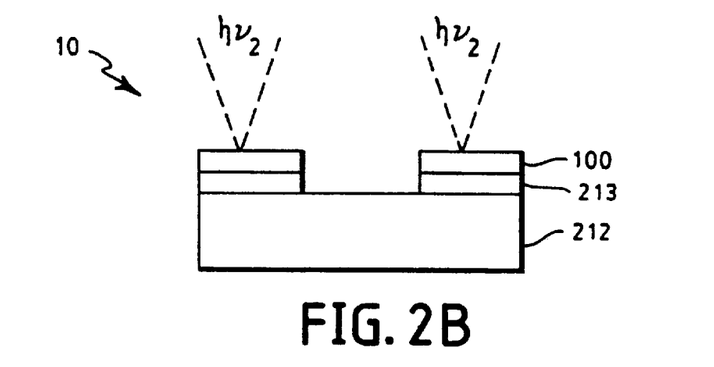
Figure 2C:
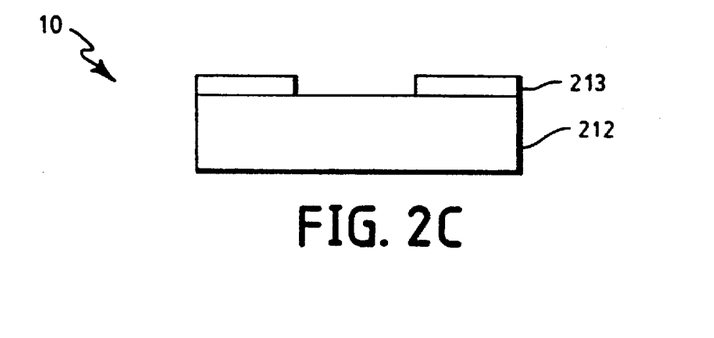

According to the first process, shown in FIGS. 2A–2C, intense radiant energy $hv_1$, is focused onto the image areas (cf., the non-electrode areas) of the ablatable laminar imaging medium 10. (For ease of presentation, imaging medium 10 is illustrated as comprising ablation enhancement layer 100, electrode forming layers 213, and the substrate 212, without detailed illustration of their more particular laminar construction.)

The intensity of this first radiant exposure $hv_1$, should be of a level sufficient to effect ablation of the unwanted plug of electrode forming layer 213, which—as a consequence of the explosive character of the ablation reaction—will result also in the removal of the overlying portions of the ablation enhancement layer 100. As should be apparent, Step 1, illustrated in FIG. 2A, is simply the aforedescribed patterning process.

As shown in FIG. 2B, the residual, unremoved portions of ablation enhancement layer 100, are removed (cf., cleaned) or made more easily removable by exposure to a second exposure to radiant energy, $hv_2$, this exposure being of a substantially lower intensity than $hv_1$. Since, by definition, ablation enhancement layer 100 will be configured to have a lower threshold than electrode forming layers 213, this second exposure—when done at the appropriate, sufficiently lower intensity—should produce an ablation effect in layer 100, without ablating or otherwise compromising electrode forming layers 213.

To produce the finished electrode-patterned substrate illustrated in FIG. 2C, a final cleaning step (cf., "rinsing") should be followed to remove blasted residue, as well as—in cases where the second exposure is conducted to weaken only remnants of layer 100—to finally remove that layer.

While the sequential patterning/cleaning exposure methodology produces good results, for certain applications requiring quick throughput, a one-step exposure methodology is preferred.

Figure 3A:
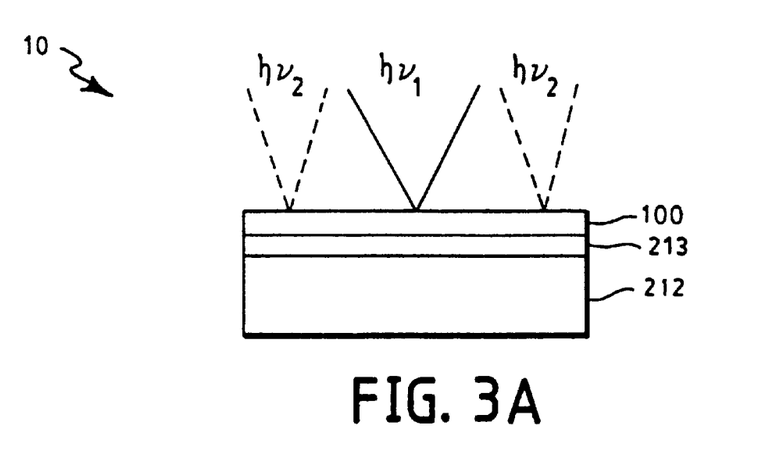
FIGS. 3A to 3B illustrate another method of processing the ablatable laminar imaging medium 10 of FIG. 1, the method involving contemporaneously-executed (cf., continuous) laser imaging and laser cleaning.
Figure 3B:
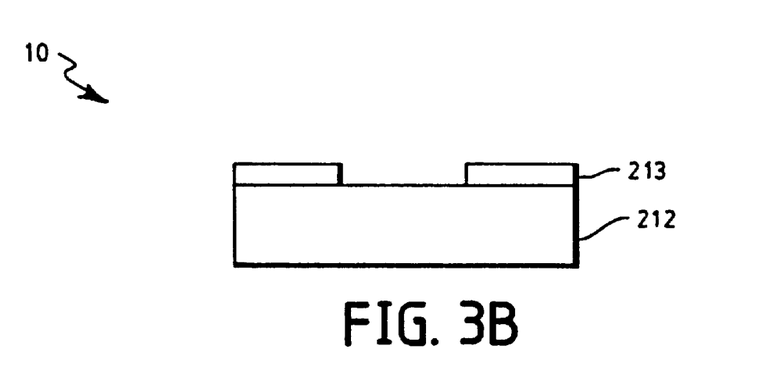

According to this methodology, which is schematically illustrated in FIGS. 3A and 3B, exposure is continuous and constant. Differentiation in respect of effecting ablation of the enhancement layer 100 only, or in concert with the ablation of electrode-forming layers 213, is effected principally by maintaining continuously active background exposure throughout the patterning operation.

The background exposure should be of an intensity effecting only the removal (or removability) of only ablation enhancement layer 100. When a portion of the electrode forming layer 213 to be removed is reached, the intensity is raised to level sufficient to effect its ablation. Intensity is lowered back to the background level when ablation of that portion is complete. As those skilled in the art will appreciate, this can be accomplished in most IR-laser based exposure devices by tuning appropriately the acousto-optic-modulator (AOM) contrast ratio in the optical head. In particular, the AOM contrast ratio is made equal to the ratio of the patterning to cleaning powers ($hv_1:hv_2$).

After laser ablation, the patterned electrode assembly is typically contaminated with redeposited debris from the ablation and surface residue. It has been found that the surface of the assembly can be effectively cleaned by washing it with water, desirably containing a surface active agent; gentle scrubbing of the surface assists in the cleaning process without harming the final electrode assembly.

After this cleaning process, a plurality of conductors are attached to portions of the top layer overlying the discrete electrodes formed during the patterning step, so that these conductors make electrical contact with the electrodes via the conductive top layer. The electrode assembly thus formed may be for use in a passive type liquid crystal display, a touch screen display or other flat panel display.

It has been found that the electrode assemblies of the present invention can readily be formed having greater than 80% transparency at 550 nm, and less than 10 ohms per square sheet resistance. Such electrode assemblies are readily incorporated into liquid crystal display assemblies of commercial quality.

Figure 4:
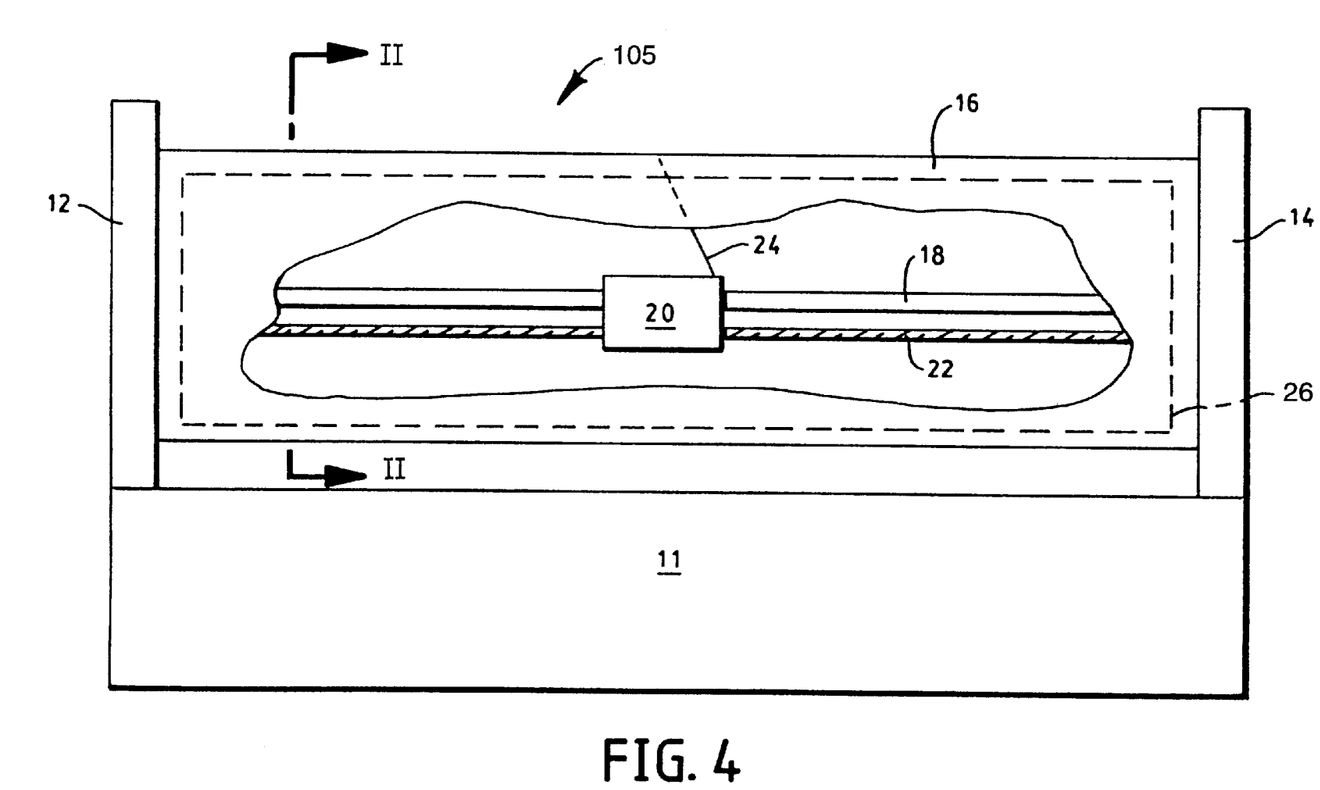
FIG. 4 is a schematic side elevation of an apparatus suited for imaging the ablatable laminar imaging medium 10 of FIG. 1.
Figure 5:
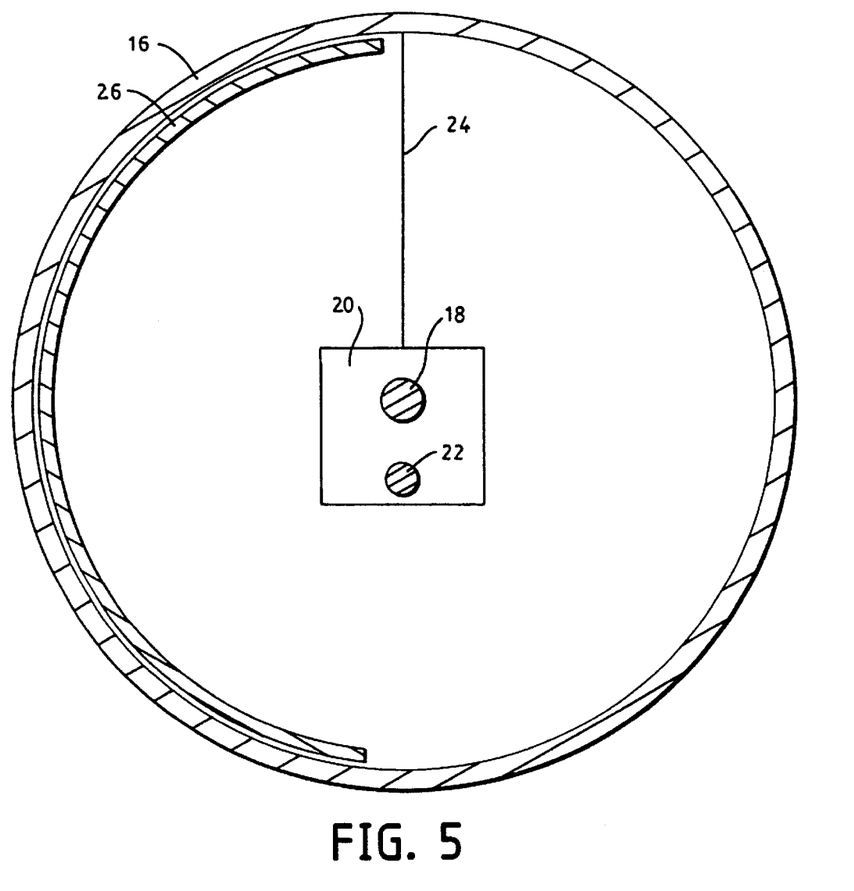
FIG. 5 is a cross-sectional view taken along the line II—II in FIG. 4.

FIGS. 4 and 5 show schematically a preferred apparatus for carrying out the patterning step of the process.

The apparatus (generally designated 105) shown in FIGS. 4 and 5 of the accompanying drawings is an internal drum laser ablation device; alternatively an external drum or flat bed device may be used.

The apparatus 105 comprises a base 11 carrying at its opposed ends two upstanding end plates 12 and 14. A cylindrical drum 16 is fixedly mounted between the end plates 12 and 14. (Part of the drum 16 is broken away in FIG. 4 to show the remaining parts of the apparatus 10.) A rod 18 is fixed between the end plates 12 and 14 and a fiber laser unit 20 is slideably mounted on this rod. The laser unit 20 is also engaged with a lead screw 22 which extends below and parallel to the rod 18. The laser unit 20 comprises a laser and a rotating mirror (neither component is shown separately in FIG. 4), which causes the laser beam 24 to emerge from the laser unit at an acute angle (typically about 65°) to the axis of the rod 18 and to rotate rapidly around this axis, thereby directing this beam around the internal surface of the drum 16.

During the patterning process, the lead screw 22 is rotated synchronously with the mirror of the laser unit 20 so that, as the beam 24 rotates, the laser unit 20 moves horizontally along the axis of the drum 16, so that the beam 24 describes a helical path along the internal surface of the drum 16. A sheet 26 of coated substrate is held by a vacuum device (not shown) against the internal surface of the drum 16 so that the beam 24 passes in a raster pattern over the sheet 26. The operation of the laser unit 20 is controlled by a computerized control unit (not shown) so as to produce the desired pattern on the sheet 26.

While only a few illustrative embodiments of the present invention have been discussed, it is understood that various modifications will be apparent to one skilled in the art in view of the totality of the description herein. All such modifications are within the spirit and scope of the invention as encompassed by the following claims.

What is claimed is:

1. A process for forming a plurality of substantially transparent electrodes upon a substrate, the process comprising the steps of:

(a) providing a laminar imaging medium comprising, in order, a substrate, a high-index metal oxide layer, an ablatable metallic conductive layer, a high-index conductive metal oxide layer, and an ablation enhancement layer having an IR-absorption greater than the IR-absorption of said high-index conductive metal oxide layer and an IR-reflectivity less than the IR-reflectivity of said high-index conductive metal oxide layer; and (b) exposing predetermined non-electrode areas of the laminar imaging medium to IR-irradiation at an intensity and duration sufficient to ablate in said non-electrode areas said ablatable metallic conductive layer, and thereby effecting removal in said non-electrode areas of said ablatable metallic conductive layer and any overlying layers; and (c) exposing predetermined electrode areas of the laminar imaging medium to IR-irradiation at an intensity and duration sufficient to effect removal by ablation of any unremoved portions of said ablation enhancement layer without appreciably effecting removal of any underlying layers in said electrode area.

2. The process of claim 1, wherein the IR-exposures in steps (b) and (c) are performed sequentially.

3. The process of claim 1, wherein the IR-exposures in steps (b) and (c) are performed contemporaneously.

* * * * *